(12) United States Patent
Tulaskar

(10) Patent No.: US 7,080,822 B2
(45) Date of Patent: Jul. 25, 2006

(54) BALL VALVE WITH A SINGLE PIECE BALL-STEM AND AN INTEGRATED ACTUATOR MOUNTING FLANGE

(75) Inventor: Manish Tulaskar, Mumbai (IN)

(73) Assignee: Plastrulon Processors Limited, Maharashtra (IN)

( * ) Notice: Subject to any disclaimer, the term of this patent is extended or adjusted under 35 U.S.C. 154(b) by 26 days.

(21) Appl. No.: 10/504,153

(22) PCT Filed: Feb. 22, 2002

(86) PCT No.: PCT/IN02/00030

§ 371 (c)(1),
(2), (4) Date: Aug. 20, 2004

(87) PCT Pub. No.: WO03/071172

PCT Pub. Date: Aug. 28, 2003

(65) Prior Publication Data

US 2005/0104026 A1    May 19, 2005

(51) Int. Cl.
*F16K 5/06* (2006.01)
(52) U.S. Cl. .......................... 251/315.01; 251/315.13; 251/315.14; 251/315.16
(58) Field of Classification Search ............ 251/315.01
See application file for complete search history.

(56) References Cited

U.S. PATENT DOCUMENTS

| 2,963,260 | A |   | 12/1960 | Siravo |
| 3,037,738 | A | * | 6/1962 | Jackson et al. ............. 251/172 |
| 3,630,224 | A | * | 12/1971 | Kalvelage .................. 137/375 |
| 4,696,323 | A |   | 9/1987 | Iff |
| 5,540,414 | A |   | 7/1996 | Giordani et al. |
| 5,634,486 | A |   | 6/1997 | Hatting et al. |

FOREIGN PATENT DOCUMENTS

| DE | G 89 10 895.7 | 9/1989 |
| DE | 44 14 716 A1 | 7/1995 |

\* cited by examiner

Primary Examiner—J. Casimer Jacyna
(74) Attorney, Agent, or Firm—Arent Fox PLLC

(57) ABSTRACT

A two piece side split ball valve with internal corrosion resistant plastic lining (4, 5), with an integral actuator mounting flange (30) for easier, cheaper & direct mounting of any standard actuator, with a single piece ball-stem (3, 7) for accurate control of the rotation & positioning of the ball (3), with energized seat rings (8, 9) for bubble tight shut-off and with means (14, 15) to prevent cold flow of lining sealing faces (16, 17) of the two body halves (1, 2) having metal to metal contact.

13 Claims, 7 Drawing Sheets

BALL VALVE WITH A SINGLE PIECE BALL-STEM AND AN INTEGRATED ACTUATOR MOUNTING FLANGE

CROSS-REFERENCE TO RELATED APPLICATION

This application is a National Stage entry of International Application No. PCT/IN02/00030, filed Feb. 22, 2002, the entire specification claims and drawings of which are incorporated herewith by reference.

BACKGROUND OF INVENTION

1. Technical Field

The present invention relates to a rotatable valve with housing made in two halves and assembled over the valve member/control element, all the surfaces coming in contact with the fluid being lined with a corrosion resistant plastic.

The valves of the above type are generally used in chemical/pharmaceutical plants handling corrosive chemicals. The purpose of the valve being controlling or shutting-off the flow of fluids through pipelines in the plant. The valves are operated using either a handle/lever fixed on top of the stem or with an actuator fitted over the top portion of the valve by means of a bracket/flange.

2. Background Art

A typical valve arrangement includes a valve housing comprising a body defining a central chamber, and having flow ports at the two axial ends thereof, and a shut-off or control element, which is generally a ball having a through bore with which a shaft is rotatably coupled. The body housing is generally made in two halves, side split or center split, being assembled together with suitable fasteners such as bolts or studs. Shut-off of fluid is achieved with the help of sealing elements or seat-rings made of plastic or elastic material, which are associated with the said housing/body, encircling the said body fluid ports and pressing over the said ball. The passage of the shaft through the housing being sealed by a second sealing element/packing, which is disposed in an annular space between the shaft and the housing. The packing can be compressed by a cover/bushing which is mounted axially along the shaft. The valve arrangement is provided in the interior of the housing with a lining of corrosion resistant plastic material like PTFE, PFA, FEP, PVDF, ETFE etc which extends at least up to the packing, with which it is in direct contact. The lining of the housing also extends over the joining face between the two body 10) halves and acts as a sealing gasket.

The U.S. Pat. No. 5,979,491 (Xomox) has an arrangement of a side split body housing, with a ball and shaft/stem made as separate parts to facilitate assembly of the valve. The stem fits into a socket or recess made in the ball. In this arrangement repeated operations of the valve can put stress on the soft plastic lining covering the ball and stem in the socket area. This can create a play between the ball and stem, due to wear/cold flow of the plastic lining over a period of time. The play makes accurate control and positioning of the ball impossible. Excessive wear can also lead to failure/cracking of the lining and cause corrosion of the metal insert of the stem or ball and eventual failure of the valve itself. There is also a chance of the ball vibrating inside the valve due to flow turbulence. The recess in the ball can also allow accumulation of material, which may not be acceptable in piping systems requiring a high state of purity.

German Utility Model DE-U 89 10 895 discloses a valve arrangement which is configured as a plastic lined ball valve. It has a one piece ball and shaft which passes through the housing, and is surrounded by a special lined packing gland, containing a spring loaded sealing element. This packing gland extends from the base of the ball-stem joint up to a certain height above the housing. This arrangement results in an additional joint to be sealed and an additional part to be lined with plastic material at a considerable cost.

There have been proposals for constructing valves having an integral ball and stem utilizing a center split body, such as shown in U.S. Pat. No. 4,696,323 (Neotecha) However, such an arrangement has the disadvantage in that, the body halves are sealed by a lined face/flange which is split at the shaft packing area. This is a potential cause for leakage as even the slightest misalignment of the two halves in the packing area will result in a gap between the packing and lining of the body. Also in this design the packing cover/gland used for loading the springs which compress the packing, itself acts as a mounting flange for the actuator. In this arrangement the screws used for fixing the mounting flange on the valve housing experience a shearing load due to the torque exerted by the actuator. The shearing effect can even cause failure of the screws or their loosening, leading to relaxation of pressure on the packing in, turn causing leakage thru the stem. Also if the mounting flange becomes loose accurate positioning of the ball is impossible.

In plastic lined ball valves the lining between the two body halves which acts as a seal, being plastic, tends to flow under compression or tends to leak due to uneven piping loads which exert a bending force on the valve body. This can result in leakage through the body halves, requiring frequent re-tightening of the body bolts. Additionally, the other seals within plastic valves, including the valve seats, must also be of a corrosion resistant or substantially inert material. Typically, such seals are formed from polytetrafluoroethylene, which is better known as PTFE. These plastic seats also tend to flow under compressive load and over time lose their effectiveness.

The mounting of an actuator on top of the ball valve without a mounting flange also requires additional brackets or fixtures to support the actuator. This means additional expenses in the form of parts and fasteners. The brackets/fixtures are required to be mounted either on the packing gland, or on top of the bonnet of the valve or on the main housing flanges, to fit the actuator. These brackets/fixtures increase the overall size of the valve and actuator assembly, causing space problems during erection of the pipeline. Also the large number of fasteners required to mount the actuator increases the chance of the actuator assembly becoming loose and leading to inaccurate control of the valve.

The integration of the actuator mounting flange into the body housing can eliminate all the problems related to actuator mounting, mentioned above. However, this requires the valve body to be side split and the stem to be long enough so as to project above the mounting flange. But the designs of heretofore existing plastic lined valves have failed to provide a valve with a one piece ball-stem and an integrated actuator mounting flange due to the difficulty of inserting and assembling a ball with an extra long stem into a side split body. A center split body cannot have an integrated actuator mounting flange.

SUMMARY OF THE INVENTION

It is therefore an object of the present invention to provide a plastic lined rotatable valve;
(i) that overcomes the shortcomings of the prior art, to provide an improved synthetic resin lined/coated valve of the aforementioned type to which is simpler in design, easier to install, easier to operate with reduced and reproducible torques and with negligible maintenance requirements;

(ii). which can be manufactured at reduced cost with reduced parts;

(iii). in which the effects of manufacturing tolerances and temperature variations on the sealing tightness and on the operating torque are reduced;

(iv). which can be useful in wide range of corrosive conditions, compatible with large variety of chemicals, for a longer period of time, giving consistent service;

(v). which is not subject to leaks due to flow of the plastic lining material or plastic seats or due to uneven piping loads.

These and other objects are achieved in accordance with the present invention by providing a ball valve (i). having areas of ball and housing coming in contact with the fluid medium, lined/coated with corrosion resistant plastic/resin material, (ii). having an actuator mounting flange, integrated into the neck of the housing, for direct mounting of an actuator on the valve without any additional brackets or fixtures, (iii). with a combined single piece ball-stem which eliminates play and lining wear associated with conventional socketed ball and stem, (iv). incorporating energized/spring loaded seat rings providing bubble tight shut-off, (v). wherein the housing shape assures minimal gap between ball and housing and facilitates the assembly of an extra long stem which is necessary in case of an integrated actuator mounting flange, (vi). with the body halves joint having metal to metal contact to counter the effect of uneven piping loads or flow of the plastic lining material/plastic seats.

(vii). with the stem having provision of bearing support and provision of seals on the packing gland for protection of internal unlined parts from external contaminants.

BRIEF DESCRIPTION OF DRAWINGS

To complement the description that is being given, and in order to promote a better understanding of the characteristics of the invention, in accordance with the practical embodiments of the same and as an integral part of the said description, a set of drawings accompany it in which, in an illustrative and non-restrictive way, the following are represented.

DISCLOSURE OF THE INVENTION

Figure 1:
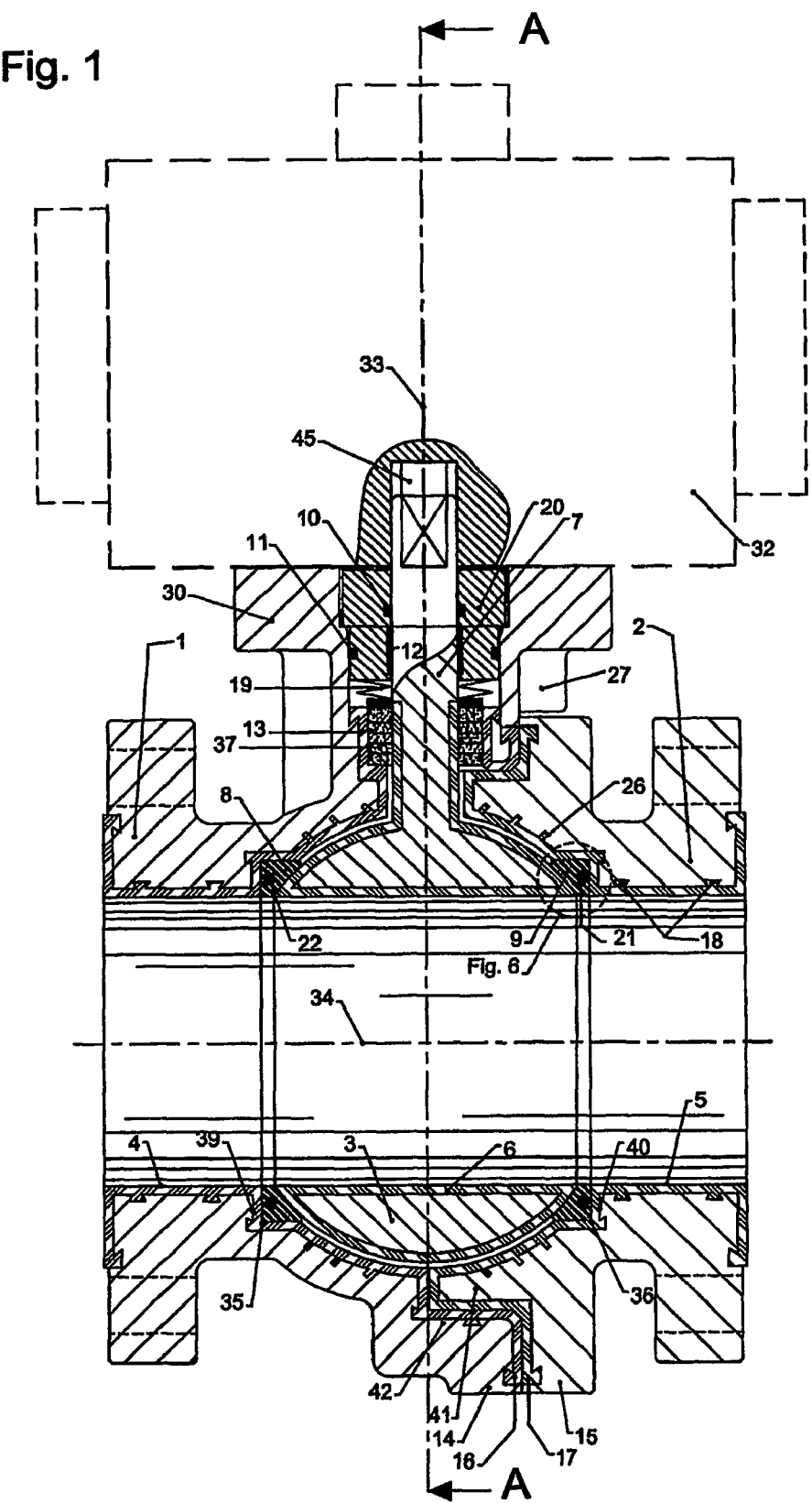
FIG. 1: Shows the cross sectional view of the ball valve according to this invention.
Figure 2:
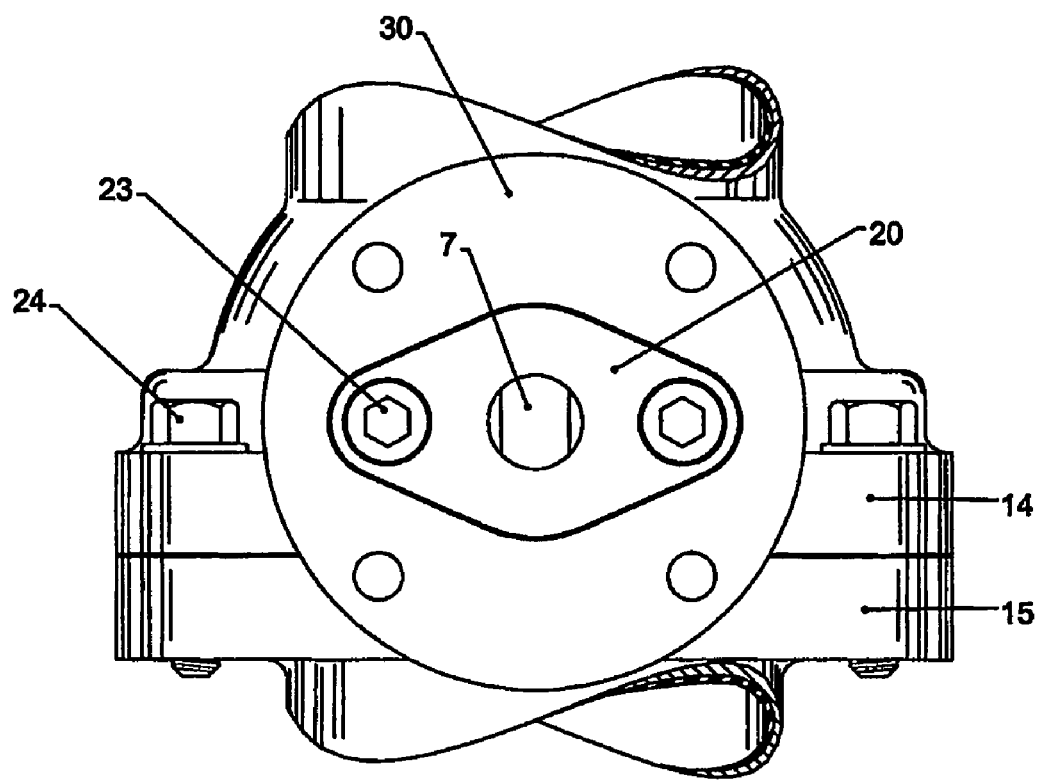
FIG. 2: Shows the top view of the actuation flange mounting area of the ball valve according to this invention.

FIG. 1 shows a valve with a two-part housing 1, 2, assembled over a ball 3, which can rotate around its axis 33. The shaft/stem 7 is integral to the ball 3, and extends through the neck of housing 1, where sealing means 37 are provided. The stem passes through the gland cover 20 and projects above it. This end of the stem is used for fixation of a handle for manual operation of the valve or with a rotary actuator 32, for automatic control. The two housing parts 1, 2 which make up the housing, are connected to each other via screws/bolts 24 (ref. FIG. 2) in a known manner, and the inner surfaces which come in contact with the medium are provided with linings 4, 5, which advantageously may be made of synthetic resin (plastic).

The housings 1,2 are composed of metal; preferably ferrous/steel casting. The smaller housing 2, has a projection 41, on the flange 15, which snugly fits into step 42 in the housing. The flanges 14,15 of the respective housing 1,2 are sealed by the lining face 16,17 which extend over the flanges 14,15. Before assembly of the two housing parts 1,2, the lining faces 16,17 project about 10–30% of their thickness over the face of flanges 14,15. During assembly, tightening of the housing bolts results in the compression of the lining faces 16,17 and when the bolts are fully tightened, the flanges 14, 15 are in metal to metal contact, while the linings 16,17 remain in an energized or loaded state due to resilient nature of the plastic. This arrangement ensures that there is no flow of the plastic lining faces as there is no space for the plastic lining to flow and that there is no leakage due to unbalanced piping loads. The lining 4,5 of the housings and lining 6 of the ball-stem is done using known processes of injection/transfer molding of melt-processable synthetic resin. The lining is locked with the help of locking grooves 18,26 made inside the body halves 1,2 and ball 3. The surfaces requiring close tolerances are then machined to get necessary accuracy and finish.

Two seating rings 8,9 are arranged axially spaced with regard to the longitudinal axis 34 of the housing and in contact with the lining 6 of the ball 3. The seat rings 8,9 are composed of a plastically and elastically deformable sealing material, in particular PTFE or a comparable material or synthetic resin. The housing parts 1, 2 contain essentially right-angled receptacles 35,36 for the respective seat rings 8, 9, which lie against on a supporting surface 39,40 facing away from the rotatable ball 3. The rotatable ball 3, is composed substantially of metal, while the surfaces which come into contact with the medium are provided with a lining 6, particularly of synthetic resin (i.e., plastic). In its interior, the rotatable ball 3 is provided with a through bore. In the position in which the rotatable ball is shown the medium can flow through the hole and through the valve, whereas after a 90-degree turn with respect to the axis of rotation 33, the flow path is blocked.

A standard rotary actuator 32, can be mounted directly on top of the integrated mounting flange 30 without using any additional brackets or supports. The top end of the stem 7, fits in to a socket 45, available in the actuator 32. The assembly of the actuator can be done by means of studs/bolts which pass through holes made in the integrated actuator mounting flange 30.

FIG. 2 which is a top view of the valve, shows the top side of the gland cover 20, which is somewhat rhomboid in shape, to facilitate its assembly, without obstructing the mounting of the actuator.

Figure 3:
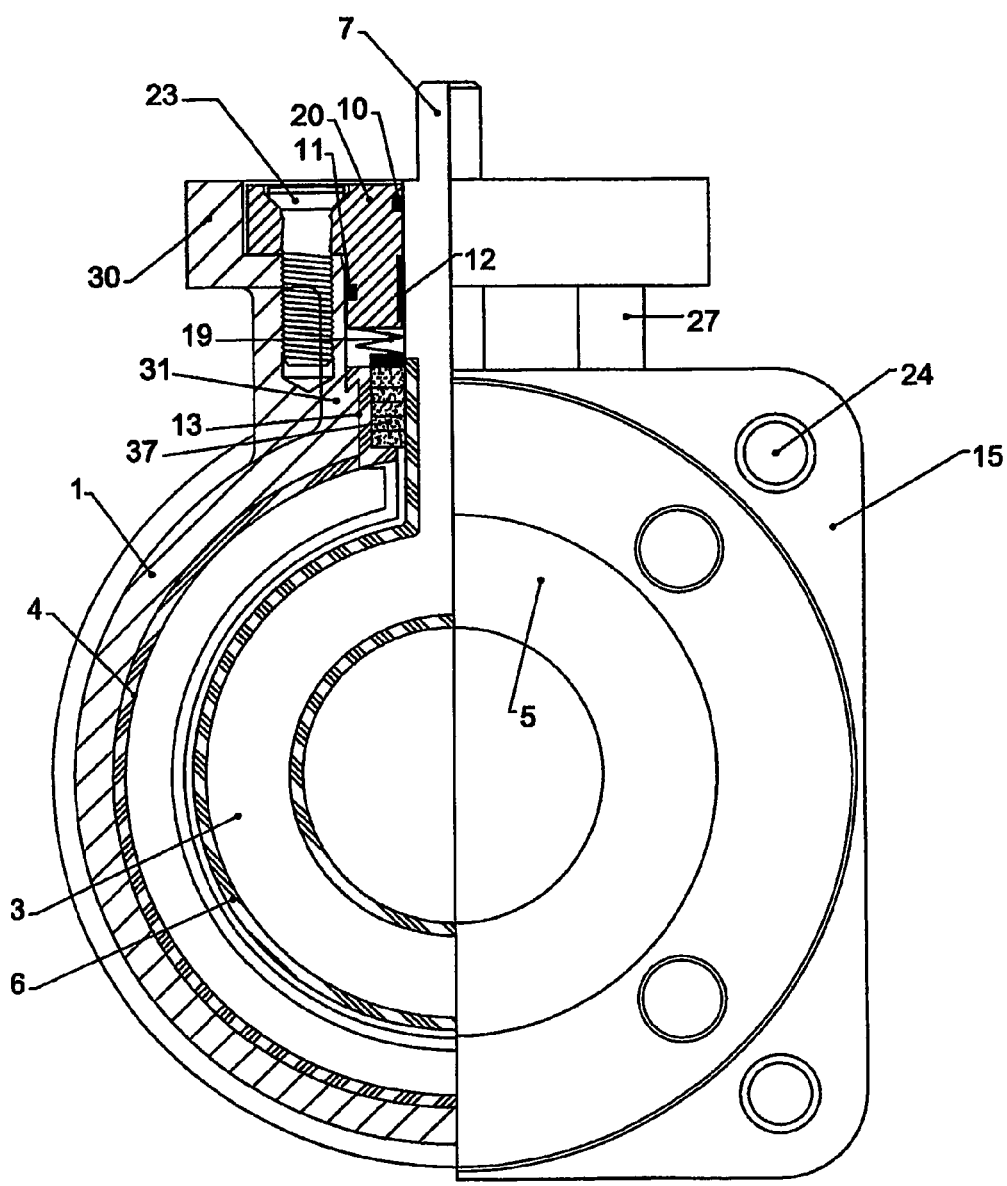
FIG. 3: Is the half sectional view of the ball valve, through A—A of FIG. 1.

FIG. 3 shows the half sectional view of the valve assembly across A—A.

The actuator mounting flange 30 is an integral part of the housing, 1. The gland cover 20 fits annularly around stem 7 of ball 3. The gland cover 20 is assembled in the housing 1, using screws 23, inside a cavity made in the actuator mounting flange 30, in such a way that the top surfaces of the gland cover 20 and the actuator mounting flange 30 are almost flush. The gland cover 20, has seals 10, 11, fitted in grooves made on the inside and outside to prevent any external fluids/contaminants from entering the valve assembly and corroding the un-lined parts. The seals are made of elastic, rubber/synthetic resin material which is temperature & corrosion resistant. The gland cover also houses the stem bearing 12, which helps to maintain the position of the ball and reduces operation torque. The stem bearing consists of a metallic sleeve coated on inside with frictionless synthetic resin material, like PTFE. The stem sealing assembly consists of a set of seal rings/packing rings 37, made of plastically and elastically deformable sealing material, in particular PTFE or a comparable material or synthetic resin. The packing rings are kept under constant pressure using a set of disc springs 19, which ensure bubble tight stem sealing under variable temperature and pressure conditions.

The neck 31 of the housing 1, has vertical ribs 27, on the outside surface which increase the load bearing capacity of the actuator mounting flange 30 and help the housing to withstand the torque exerted through the actuator during opening and closing of the valve. The actuator mounting flange 30, is provided with drilling as per standards, so as to facilitate mounting of any standard actuator directly on the valve. The actuator can be fixed with screws/bolts, on top of the flange in a known manner.

Figure 4:
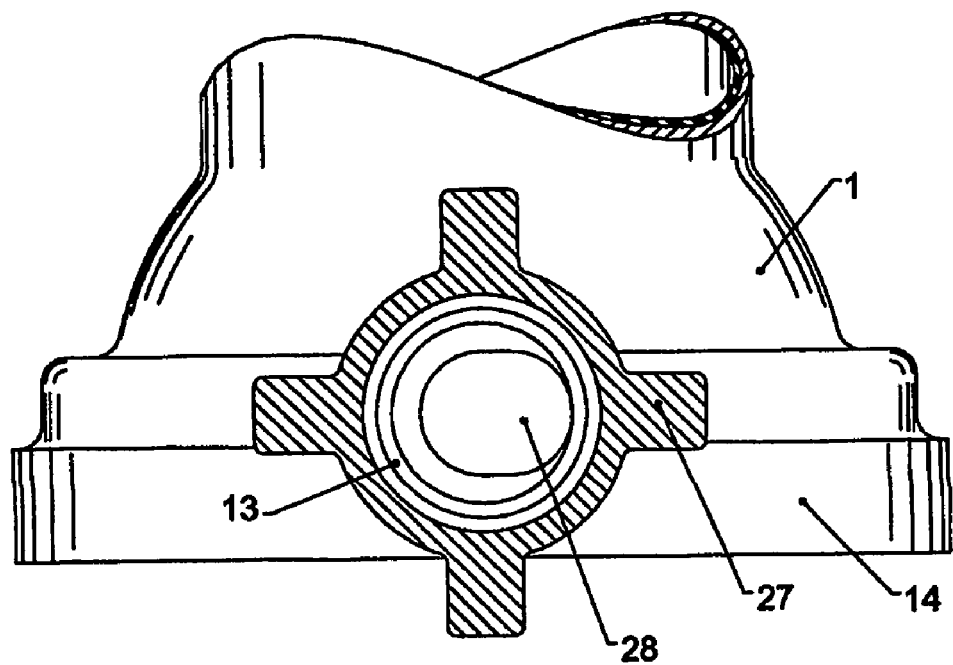
FIG. 4: Is the sectional view of the ball valve, through B—B of FIG. 5.

FIG. 4 shows a sectional view of the neck portion of the housing 1, across B—B. It shows the oblong opening 28, in the base of the packing receptacle 13, through which the stem 7 of ball 3, enters during assembly of the valve.

Figure 5:
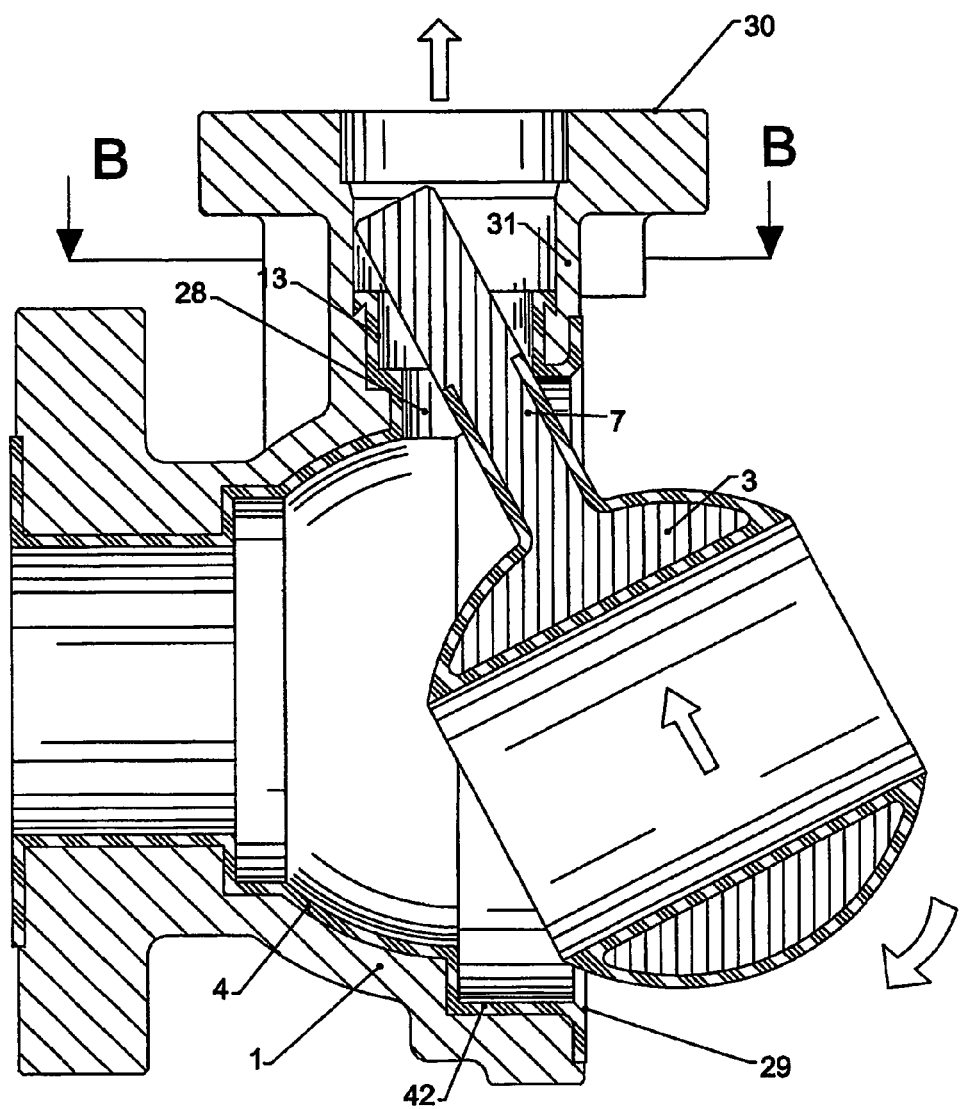
FIG. 5: Is the sectional view of the ball valve explaining the assembly procedure of the one-piece ball and stem.

FIG. 5 shows a ball 3, in the process of entry inside housing 1.

The shape of the body housing, 1 has been specially designed to facilitate the insertion of the extra long one piece ball-stem in to the side split housing, with the stem passing through a narrow neck 31, at the top of the housing. This has been achieved by providing a step 42 at the end of the central spherical chamber in the larger body housing 1, which houses the ball, 3. The diameter of this step is designed utilizing three dimensional geometric analysis of the motion of the ball during the process of insertion. The step ensures that the lower spherical portion of the ball 3 is not obstructed by the rim 29, of the opening of the housing. The step also helps in reducing the entry angle of the ball 3, during insertion making the entry more vertical. The entry angle of the ball 3 is further improved by making the opening 28 at the base of the packing area 13, in the neck, to be oblong instead of circular. The entry of the ball is additionally facilitated by provision of chamfer of 45 degree on the rim 29, of the opening of the housing 1. The obstruction of the top end of the stem in the neck of the housing is prevented by enlarging the inside diameter of the neck 31, above the lining of the packing area 13. The reduction in wall thickness of the neck in this portion is compensated by provision of ribs 27, on the outside of the neck.

Figure 6:
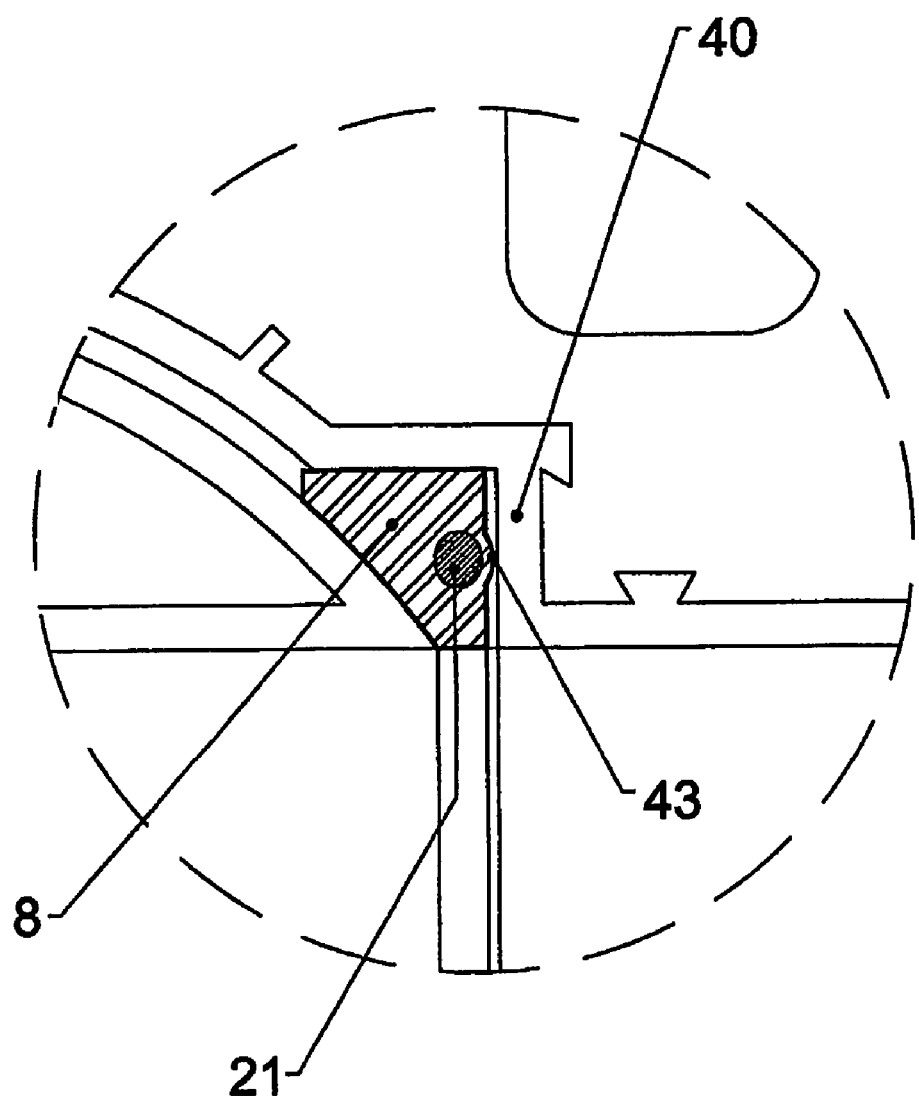
FIG. 6: Is the enlarged view of the seat ring area.
Figure 7:
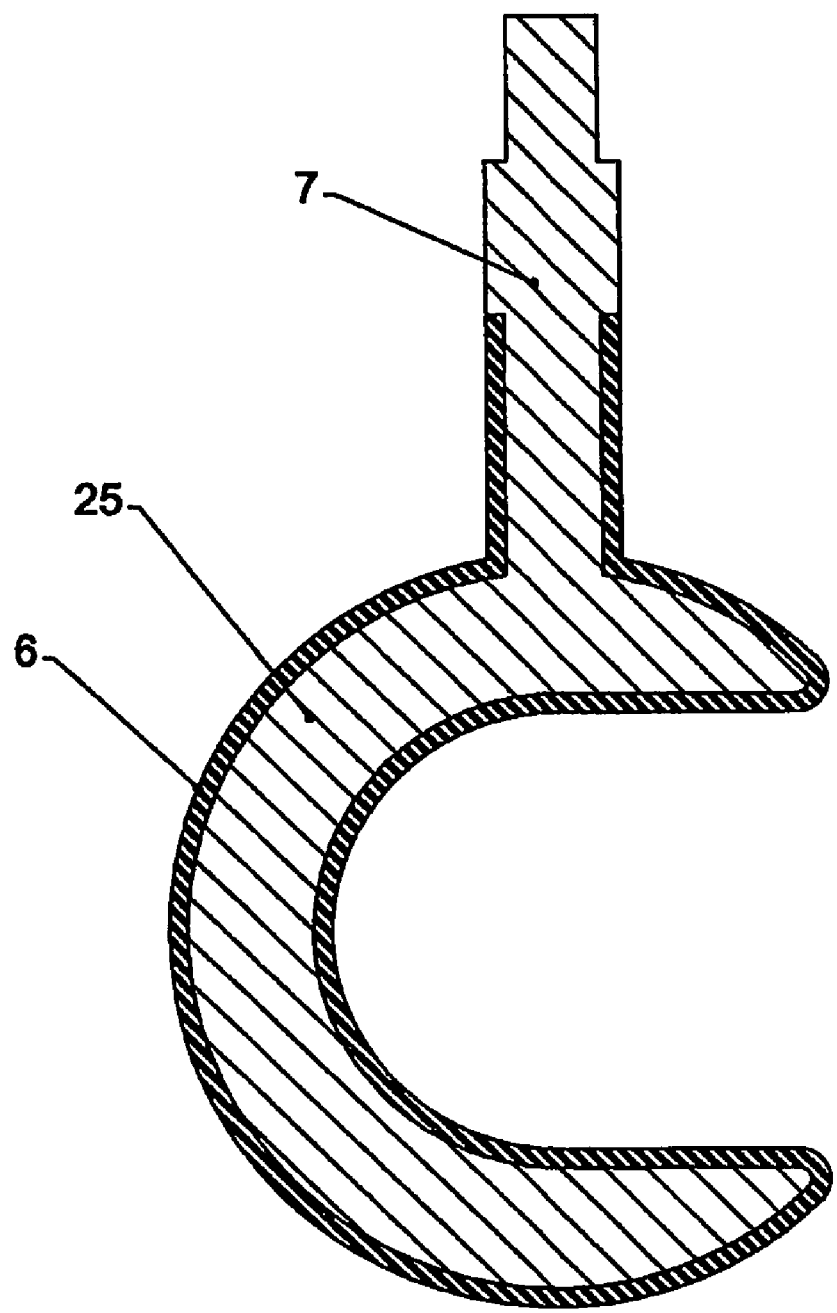
FIG. 7: Is the sectional view of the C-shaped valve member (AC@-Ball) which is an alternative for the ball.

FIG. 6 shows an enlarged view of the seat-ring area. The seat rings 8,9, consist of ring with a some what triangular cross section and encapsulate a corrosion/temperature resistant elastic rubber/synthetic resin o-ring 21,22. The encapsulated o-rings are positioned on the side opposite to the rotatable ball 3. The encapsulation results in formation of circular compressible rib 43 which press against the supporting faces 39, 40. This keeps the seat ring energized or spring loaded, ensuring a constant sealing force on the ball under variable temperature and pressure conditions FIG. 7 shows the cross-section of a AC@-Ball 25; a roughly AC@ shaped valve member/control element, which can be used alternatively to ball 3, in a variation of the valve assembly in FIG. 1, for achieving specific flow characteristics.

The invention claimed is:

1. A side split ball valve comprising:
   a valve housing:
   said valve housing including a first body half and a second body half assembled together at a junction, forming a chamber therebetween for fluid communication therethrough;
   said first body half being larger than the second body half and comprising a passageway/neck portion;
   said body halves having axially aligned body flanges at the junction and lined/coated with corrosion resistant plastic/resin material in areas coming into contact with fluid;
   said linings extending over the said body flanges, forming sealing faces on either side of the junction wherein:
   a rotatable valve member comprising a substantially long integral actuating shaft/stem is disposed within said chamber;
   said shaft/stem passing through the said passageway/neck portion and extending out of the valve housing, with means for sealing between said shaft/stem and said passageway/neck portion;
   said valve member and stem/shaft being lined/coated with corrosion resistant plastic/resin material in areas coming into contact with the fluid; and
   an actuator mounting flange disposed integral with the valve housing for direct mounting of a standard rotary actuator on top of the valve housing;
   wherein said means of stem/shaft sealing are a set of packing rings pressurized by a gland, positioned outwardly of said packing rings and disposed in a cavity made in said integrated actuator mounting flange, being flush with the top of the flange, thereby facilitating direct mounting of a standard rotary actuator without the use of additional supports/brackets/adapters on top of the valve housing.

2. The valve as claimed in claim 1, wherein said each body half includes a half chamber portion having a flow conduit connected thereto for fluid communication with the chamber.

3. The valve as claimed in claim 2, wherein each of said half chambers is substantially hemispherical.

4. The valve as claimed in claim 1, wherein metal to metal contact is provided between the flanges of the body halves, outwardly to the sealing faces.

5. The valve as claimed in claim 1, wherein said valve member is a ball having a flow-way therethrough.

6. The valve as claimed in claim 1, wherein said valve member alternatively is roughly C-shaped element.

7. The valve as claimed in claim 1, wherein the lining/coating extends substantially above the packing area of the stem.

8. The valve as claimed in claim 1, wherein the means of sealing the valve member comprises of seat rings positioned in said valve housing at the intersection of said chamber and one of said flow conduits to seal with said valve member.

9. The valve as claimed in claim 8, wherein said seat rings include an annular body of plastically and elastically deformable, preferably corrosion resistant material like polytetrafluoroethylene, polyamide, and graphitic carbon;

a resilient o-ring encapsulated in the annular body, made preferably of corrosion resistant material, with the encapsulation resulting in a projected, energized rib which ensures bubble tight shut-off of the valve member.

10. The valve as claimed in claim 9, wherein a set of disc springs is positioned between said packing gland and the packing for maintaining constant sealing pressure.

11. The valve as claimed in claim 10, wherein the said packing gland includes resilient o-rings of preferably corrosion resistant material for prevention of entry of external contaminants/chemicals.

12. The valve as claimed in claim 1, wherein the said packing gland includes a bush bearing for enabling smooth rotation and proper positioning of the said stem.

13. The valve as claimed in claim 1, wherein the said rhombus shaped packing gland is disposed inside the cavity made in the said integrated actuator mounting flange.

* * * * *